US007016943B2

(12) United States Patent
Freeny

(10) Patent No.: US 7,016,943 B2
(45) Date of Patent: Mar. 21, 2006

(54) SPLIT PERSONAL COMPUTER SYSTEM

(75) Inventor: Charles C. Freeny, Dallas, TX (US)

(73) Assignee: Automated Business Companies, Spring, TX (US)

(*) Notice: Subject to any disclaimer, the term of this patent is extended or adjusted under 35 U.S.C. 154(b) by 290 days.

(21) Appl. No.: 10/253,332

(22) Filed: Sep. 23, 2002

(65) Prior Publication Data

US 2003/0078988 A1 Apr. 24, 2003

Related U.S. Application Data

(63) Continuation of application No. 10/050,624, filed on Jan. 16, 2002, now abandoned, which is a continuation of application No. 09/443,125, filed on Nov. 18, 1999, now Pat. No. 6,360,253, which is a continuation of application No. 09/014,859, filed on Jan. 29, 1998, now Pat. No. 6,243,743.

(51) Int. Cl.
*G06F 15/16* (2006.01)

(52) U.S. Cl. .................. 709/217; 709/202; 709/212; 709/203; 709/216; 709/250

(58) Field of Classification Search ............... 709/203, 709/202, 212, 216, 219, 217, 250
See application file for complete search history.

(56) References Cited

U.S. PATENT DOCUMENTS

| 5,210,825 | A | * | 5/1993 | Kavaler ................. 345/636 |
| 5,642,515 | A | * | 6/1997 | Jones et al. ............. 710/220 |
| 5,696,901 | A |   | 12/1997 | Konrad |

(Continued)

FOREIGN PATENT DOCUMENTS

WO    9728623    8/1997

OTHER PUBLICATIONS

"Good-Bye, GUI-HELLO NUI"; Byte, Jul. 1997; pp. 60–72.
"Part I-Cheaper Computing", Byte, Apr. 1997; pp. 66–80.
"IBM Technical Disclosure Bulletin"; 700 IBM Technical Disclosure Bulletin; vol. 30, No. 12, May 1988, Armonk, NY USA; pp. 30–33.
"Banyan's Intranet Connect Software", www.intranetjournal.com/ix/arc/3088.html, Intranet exchange, Jun. 8, 2004, 3 pages.
"Giving Mobile Users Access to Intranets", www.lantimes.com/97/97jul/707b019a.html, CMPnet, Jul. 21, 1997, 2 pages.
"Reachout Complete Remote Access" User's Guide, ReachOut Software Programs, Stac, Inc. 1991–95, pp. 1–41.
"CoSession for Windows", Remote and Host Software, User's Guide, Triton Technologies, Inc., Revised Dec. 30, 1993.
"The Noton PcAnywhere for Windows", Symantec, Version 2, Remote Computing and Communications.

(Continued)

*Primary Examiner*—Saleh Najjar
(74) *Attorney, Agent, or Firm*—Dunlap, Codding & Rogers, P.C.

(57) ABSTRACT

A personal computer system split into a local portion and a remote portion. In one embodiment the remote portion of the split personal computer system is located in a remote location and normally maintained by a network service provider and has personal computer application programs stored thereon that are controlled by the individuals local portion. The remote portion provides one or more personal computer application programs as a service that can be selected by the individual and stores the individuals data after running the personal computer application program selected by the individual. Both the selected program and the individuals data can be accessed upon providing a valid password by the individual. The remote portion has a controller that can collect fees for the application program services provided each individual.

2 Claims, 4 Drawing Sheets

U.S. PATENT DOCUMENTS

| | | | |
|---|---|---|---|
| 5,771,354 A | | 6/1998 | Crawford |
| 5,805,806 A | | 9/1998 | McArthur |
| 5,812,930 A | | 9/1998 | Zavrel |
| 5,832,223 A | | 11/1998 | Hare et al. |
| 5,835,717 A | | 11/1998 | Karlton et al. |
| 5,845,282 A | * | 12/1998 | Alley et al. ................... 707/10 |
| 5,850,265 A | | 12/1998 | Suh |
| 5,850,340 A | | 12/1998 | York |
| 5,852,437 A | | 12/1998 | Wugofski et al. |
| 5,852,713 A | | 12/1998 | Shannon |
| 5,857,142 A | | 1/1999 | Lin et al. |
| 5,889,845 A | | 3/1999 | Staples et al. |
| 5,889,942 A | | 3/1999 | Orenshteyn |
| 5,898,419 A | * | 4/1999 | Liu ............................. 345/660 |
| 5,933,597 A | * | 8/1999 | Hogan ........................ 709/204 |
| 5,940,074 A | | 8/1999 | Britt, Jr. et al. |
| 5,940,387 A | | 8/1999 | Humpleman |
| 5,961,586 A | | 10/1999 | Pederson |
| 5,974,444 A | | 10/1999 | Konrad |
| 5,982,363 A | | 11/1999 | Naiff |
| 6,049,831 A | | 4/2000 | Gardell et al. |
| 6,115,736 A | * | 9/2000 | Devarakonda et al. ...... 709/202 |
| 6,122,674 A | * | 9/2000 | Olnowich ................... 709/250 |
| 6,138,150 A | * | 10/2000 | Nichols et al. ............. 709/219 |
| 6,166,734 A | | 12/2000 | Nahi et al. |
| 6,167,441 A | | 12/2000 | Himmel |
| 6,181,326 B1 | | 1/2001 | Takahashi |
| 6,233,608 B1 | | 5/2001 | Laursen et al. |
| 6,243,743 B1 | | 6/2001 | Freeny |
| 6,259,443 B1 | | 7/2001 | Williams, Jr. |
| 6,311,197 B1 | | 10/2001 | Mighdoll et al. |
| 6,351,771 B1 | | 2/2002 | Craddock et al. |
| 6,359,892 B1 | | 3/2002 | Szlam |
| 6,360,253 B1 | | 3/2002 | Freeny |
| 6,453,334 B1 | * | 9/2002 | Vinson et al. .............. 709/203 |
| 6,463,459 B1 | | 10/2002 | Orr et al. |
| 6,728,786 B1 | * | 4/2004 | Hawkins et al. ............ 709/248 |

OTHER PUBLICATIONS

"NetOp Remote Control for Linux, Product Review, Aug. 11, 2003", www.linuxworld.com/story/33892.htm.

"NetOp gives Linux control of remote Windows desktops, Mar. 25, 2003, author: roblimo", http://networking.itmanagersjournal.com/article.pl?sid=03/10/12/162237.

"X" in Linux, May 18, 1998, Geoffey Bennett, www.apcmag.com/ape/v3.nsf/0/A50FAC1610EA551ECA256D44001AD7BF.

"The Wonders of X", Dec. 14, 2001, Ashton Mills, www.apcmaq.com/apc/v3.nsf/0/0866C58D1276A3F9CA256D44001A750B.

"Linux Jun. 98", May 18, 1998, Geoffrey Bennett, www.apcmag.com/apc/v3.nsf/0/F5A80F2570C5E04CA256D4400206BAC.

"Linux on a laptop", Jun. 16, 1998, Geoffey Bennett, www.apcmag.com/apc/v3.nsf/0/4893C740DB353694CA256D44001AD79B.

"Linux Dec. 97", Nov. 21, 1997, Geoffrey Bennett, www.apcmag.com/apc/v3.nsf/0/4D1C3A8DDA4DB8DDCA256D44002082CC.

"Windows onto linux", Dec 19, 2001, Ashton Mills, www.apcmag.com/apc/v3.nsf/0/E16111E109E932A3CA256D44001A7486.

"Seven Penguin power plays", Jan. 21, 2003, APC staff, www.apcmag.com/apc/v3.nsf/0/60B4A8004FF9E3BBCA256D44001A488F.

"What is XFree86® Home to the X Window System", www.xfree86.org.

"The Current XFree86® Release, Xfree 86 Release 4.4.0", www.xfree86.org/releases/rel440.html.

"Documentation for XFree86[tm] version 4.4.0, The XFree86 Project, Inc., Feb. 29, 2004", www.xfree86.org/4.4.0.

"Downloading the XFree 86 4.4.0 binaries", www.xfree86.org/4.4.0/Install2.html.

README for XFree86[tm]4.4.0., The Xfree86 Project, Inc., www.xfree86.org/4.4.0/README.html.

"WinaXe: Linux Hand In Hand with Windows" Linux for you, Mar. 2003 edition.

University of Durham, Information Technology Service, InfoSheet 101, Version 1.0, "Setting up a remote X Window", 101XWindows.doc: Jan. 1999.

"Installing XFree 86 4.4.0 using the X Install.sh script", www.xfree86.org/4.4.0/Install3.html.

"X SecurePro Secure X–Server for Windows free download by Labtam Inc.: S . . . TCP/IP, FTP LPR, LPD, telnet client server, NFS, Now with unique" www.softpile.com/Utilities/Network/Download__09036__1.html.

Virtual Network Computing Tristan Richardson, Quentin Stafford–Fraser, Kenneth R. Wood and Andy Hopper, IEEE Internet Computing, vol. 2, No. 1, Jan./Feb. 1998.

"Sharing computers on a Linux (or heterogeneous) network, Part 1", www–106.ibm.com/developerworks/library/1–share1.html.

"Remote Control for Everybody: VNC Crosses Networks and Platforms" http://networkingworking.earthweb.com/netos/article.php/1470341.

"Sharing computers on a Linux (or heterogeneous network Part 2", http://www=106.ibm.com/developerworks/linux/library/1–share2/.

"Global Teleporting with Java: Toward Ubiquitous Personalized Computing", IEEE, Feb. 1997, pp. 53–59.

Automated Business Companies v. Citrix Systems, Inc., and Citrix Online, LLC, Answer of Citrix Systems, Inc. And Citrix Online, LLC. Civil Action No. H–05–0682, U.S. District Court for the Southern District of Texas Houston Division.

Mobile GUI On The Web, Fall 1994, Web Conference in Boston, Daniel Dardailler, pp. 1–11.

'Experiences with X in a Wireless Environment', Christopher Kent Kantarjiev, et al., pp. 1–16.*

'XTV: A Framework for Sharing X Window Clients in Remote Synchronous Collaboration' Proceedings of IEEE TriComm 91: Communications for Distributed Applications & Systems, Chapel Hill, North Carolina, Apr. 1991.*

'A Survey of X Protocol Multiplexors', Swiss Federal Institute of Technology, Computer Engineering and Networks Laboratory (TIK), ETH–Zentrum, ETZ, CH–8092 Zurich, Switzerland, John Eric Baldeschwieler, et al., pp. 16–24.*

Defendant's Opposition to Plaintiff's Motion to Dismiss Defendants' Amended Unenforceability Affirmative Defense and Counterclaim of Citrix Systems, Inc.*

Plaintiff's Motion to Dismiss Defendant's Amended Unenforceability Affirmative Defense and Counterclaim.*

Personal Interactive Computing Objects, Roy Want and Andy Hopper, Olivetti Research Ltd, 24a Trumpington Street, Cambridge CB2 1QA, England; Undated.

Remoting Peripherals Using Memory–Mapped Networks, S.J. Hodges, S.L. Pope, D.E. Roberts, G.E. Mapp and A. Hopper, Undated, pp. 1–3.

Spirit: A Resource Database for Mobile Users, Noha Adly, Pete Steggles and Andy Harter; Computer Laboratory, Cambridge University, Cambridge CB2 3QG, UK; Undated, pp. 1–10.

Design and Use of High–Speed Networks in Multimedia Applications, Andy Hopper, ORL–91–2; Published in Proceeding of $3^{rd}$ IFIP Conference on High Speed Networking Berlin, Mar. 91., pp. 1–14.

Teleporting –Making Applications Mobile, Frazer Bennett, Tristan Richardson, Andy Harter, Olivetti Research Laboratory, Undated.

Supporting User Mobility, Martin G. Brown, Olivetti Research Ltd. 24a Trumpington St., Cambridge, CBI 1QA, UK; undated.

Teleporting, Mobile X Session, Tristan Richardson; Undated, pp. 1–8.

The Cambridge Fast Ring Networking System, Andrew Hopper and Roger M. Needham, ORL–88–1, Copyright © 1990 Olivetti Research Limited; vol. 37, No. 10, Oct. 1988.

Pandora: An Experiment in Distributed Multimedia, Tony King, ORL 92–5, To be published in the Proceedings of Eurographics '92, Sep. 1992.

Pandora –an experimental system for multimedia applications, Andy Hopper, ORL–90–1, Published In 'Operating Systems Review' 12 Jan. 1990; pp. 1–16.

A Distributed Location System for the Active Office, Andy Harter of Olivetti Research Limited and Andy Hopper of the University of Cambridge, UK; Nov. 1993.

Network Cards for the Pandora Multimedia System, DJ Clarke, Olivetti Research Limited and GJ Stark, Advanced Telecommunication Module Ltd., ORL Technical Report 94–5, pp. 1–14.

Mobile Computing with Python, James "Wez"Weatherall & David Scott, Laboratory for Communication Engineering, Cambridge, England, {jnw22,djs55}@eng.cam.ac.uk; undated.

Teleporting in an X Window System Environment, Tristan Richardson, Frazer Bennett, Glenford Mapp, and Andy Hopper, Nov. 1993, pp. 1–14.

Digital Video on Computer Workstations, Andy Hopper, ORL 92–6, To be published in the Proceeding of Eurographics, Sep. 1992, pp. 1–14.

* cited by examiner

SPLIT PERSONAL COMPUTER SYSTEM

CROSS REFERENCE TO RELATED APPLICATIONS

This application is a continuation of U.S. Ser. No. 10/050,624, filed Jan. 16, 2002, now abandoned, which is a continuation of U.S. Ser. No. 09/443,125, filed Nov. 18, 1999, now U.S. Pat. No. 6,360,253; which is a continuation of U.S. Ser. No. 09/014,859, filed Jan. 29, 1998, now U.S. Pat. No. 6,243,743. The entire content of U.S. Ser. Nos. 10/050,624, 09/443,125 and 09/014,859 is hereby incorporated herein by reference in its entirety.

STATEMENT REGARDING FEDERALLY SPONSORED RESEARCH OR DEVELOPMENT

Not applicable.

BACKGROUND OF THE INVENTION

Many people currently use several computers in the execution of their job duties. For example, an individual may have one computer located at work, another computer located in an office at home, and yet another computer which is portable to use when the individual is neither at work nor at home. The quickly changing technology in the computer area constantly requires consumers to upgrade their computer systems to meet their demands. This means that the individual must separately upgrade the software and hardware on each of the office computer, the home computer and the portable computer. To upgrade all three computers requires three separate software licenses and hardware items which are costly.

Communications software for personal computers, such as pcAnywhere obtainable from Symantec Corporation are currently available. These communication software packages permit an individual to control a first computer from a second computer over phone lines.

Large communication networks are currently in use for providing cable television and telephone services to remote locations, such as homes, offices and hotel rooms. In addition, another large network known as the "internet" is being used to permit remote computers to communicate with each other. Cable television companies have recently been interfacing the cable television networks to the telephone and internet networks to provide access to all three networks through the cable television connection provided in a large number of homes.

The companies are working to bring simpler and lower cost internet access to hundreds of millions of households by combining low cost cable television desk top controls with the phone system and a keyboard. This combination of elements and new products will allow users to access the internet and perform interactive tasks such as: a) e-mail; b) database searches; and c) interactive games and advertising.

Time share computer systems have been used for many years. With conventional time share systems, individuals could connect to a central computer from a so-called "dumb" terminal and purchase time on a shared computer system. The dumb terminal communicated with the shared computer system via either phone line or hard wire remote terminal lines. The time share systems have largely been replaced by a personal computer, or a local area network (LAN) system which connects a large number of personal computers together so that resources can be shared.

However, these new systems and networks do not address the problems facing computer users which are: 1) fast obsolescence of personal computer models and operating systems; 2) increasing demand for more memory and speed; 3) constant upgrades of software programs; and 4) need for computer portability by more and more people. It is to such an improved split personal computer system that the present invention is directed. The system of the present invention can be implemented by utilizing a programming language called JAVA, which was developed by Sun Microsystems, Inc. The JAVA language is ideally suited to allow communication between the Graphical User Interface (GUI) requirements of a local portion of the split personal computer system and the remote portion of the split personal computer system. The remote portion of the split personal computer system can operate C++ language application programs.

SUMMARY OF THE INVENTION

The present invention relates to a split personal computer system including a remote portion and at least one local portion which is disposed remotely from the remote portion. The remote portion of the split personal computer system is adapted to perform the heavy computational and storage portions of the personal computer tasks, and the local portion of the split personal computer system is adapted to solely perform the video and the input/output portions of the personal computer tasks so that an individual manipulating the local portion of the split personal computer system is provided with the illusion of utilizing a complete personal computer system.

The remote portion of the split personal computer system includes at least one remote computer unit.

In one embodiment of the present invention, the local portion of the split personal computer system includes a television display unit, a television accessory unit in communication with the television display unit, and an input unit located in close proximity to the television display unit and in communication with the television accessory unit to input data signals into the television accessory unit. The television display unit selectively displays television signals output by the television accessory unit in a format perceivable by an individual located near the television display unit.

The system is also provided with a communication means for interfacing the television accessory unit of the local portion of the split personal computer system with the remote computer unit of the remote portion of the split personal computer system for permitting data signals received by the television accessory unit from the input unit to be transmittable from the television accessory unit to the remote computer unit. The received data signals are processable by the remote computer unit to generate output signals. The output signals are transmittable from the remote computer unit to the television accessory unit, and then transmittable from the television accessory unit to the television display unit as television signals whereby the input unit is capable of functioning as an input unit for the remote computer unit and the television display unit is capable of functioning as a monitor for the remote computer unit to provide the illusion of a complete computer system from the point of view of the individual located adjacent the television display unit.

One advantage of the present invention is that it permits the individual to operate the remote portion of the split personal computer system, for example, utilizing only the television display unit, the television accessory unit and the input unit. Because television display units are already provided in a large number of locations, such as homes and hotel rooms, the individual need only obtain the television accessory unit and the input unit to remotely operate the remote portion of the split personal computer system.

In one embodiment of the present invention, the remote portion of the split personal computer system communicates with the television accessory unit of the local portion of the split personal computer system over an internet network. The internet network can be interfaced with a cable television network so that internet access is provided from the cable television connection currently provided in homes, hotels and businesses. The television accessory unit can be included in a cable television interface box interconnecting the television display unit to the cable television connection.

In yet a further embodiment of the present invention, the television accessory unit can be provided in a portable housing. The advantage of the portable housing is that the individual can transport the television accessory unit from one location to another location to remotely operate the remote portion of the split personal computer system with different television display units.

In yet another embodiment of the present invention, the remote computer unit of the remote portion of the split personal computer system can be provided as a plurality of networked computers which are controlled by a remote system controller. In this embodiment, a plurality of local portions of the split personal computer system are contemplated with each of the local portions of the split personal computer system being disposed remotely from the remote portion of the split personal computer system, and remotely from the other local portions of the split personal computer system. For example, each of the local portions of the split personal computer system could be provided in an individual's home or hotel room or any other location commonly including or adapted to receive a television display unit. The remote system controller can be provided with a billing program which counts the number of minutes that respective local portions of the split personal computer system are operating at least one of the networked computers of the remote portion of the split personal computer system. By employing the remote system controller and the billing program, individuals can "rent" computer time from the remote portion of the split personal computer system and obtain the benefits of a centralized management team upgrading the application software and the hardware on the remote portion of the split personal computer system.

Other objects, features and advantages of the present invention are apparent from the following detailed description when read in conjunction with the attached drawings and appended claims.

DETAILED DESCRIPTION OF THE INVENTION

The terms "internet" and/or "communication link", as used herein, refer to any suitable communication link which permits electronic communications, such as extra computer communication systems, intra computer communication systems, internal buses, local area networks, wide area networks, point to point shared and dedicated communications, infra red links, microwave links, telephone links, cable TV links, satellite links, radio links, fiber optic links, cable links and/or any other suitable communication system. It should be understood that each of the communication links are shown and described separately herein for the sole purpose of clearly illustrating the information being communicated between the various components. The communication links may not be separate communication links but may be a single physical communication link.

Figure 1:
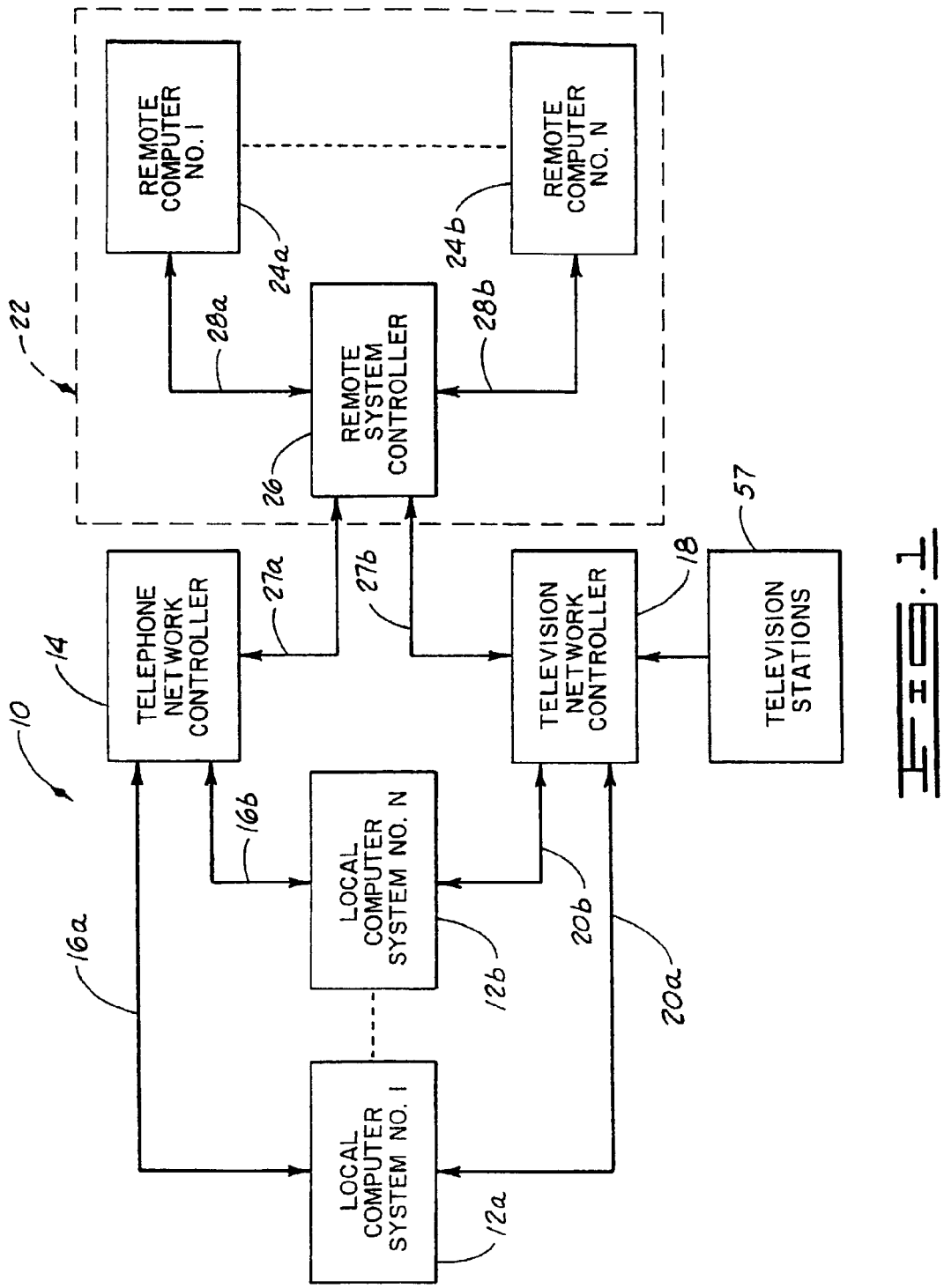
FIG. 1 is a schematic, diagrammatic view of a split personal computer system constructed in accordance with the present invention which includes a local portion of the split personal computer system communicating with a remote portion of the split personal computer system.

Referring now to the drawings and more particularly to FIG. 1, shown therein and designated by the general reference numeral 10 is one embodiment of a split personal computer system constructed in accordance with the present invention. The split personal computer system 10 includes a plurality of local portions 12 disposed remotely with respect to each other. Only two local portions 12 of the split personal computer system 10 are shown and designated by the general reference numerals 12a and 12b in FIG. 1 for purposes of clarity. The local portions 12a and 12b of the split personal computer system 10 can be located in homes, hotel rooms, or any other suitable location and can be adapted to solely perform the video and the input/output portions of the personal computer tasks so that an individual manipulating one of the local portions 12 of the split personal computer system 10 is provided with the illusion of utilizing a complete personal computer system.

The local portions 12a and 12b of the split personal computer system 10 communicate with a telephone network controller 14 via respective communication links 16a and 16b, and a television network controller 18 via respective communication links 20a and 20b. The telephone network controller 14 can be any type of bidirectional communication system, such as a direct phone line using a 1–800 line or the internet. The television network controller 18 can be any type of high-bandwidth communication system which permits at least unidirectional communications and possibly bi-directional communications. For example, the telephone network controller 14 and the television network controller 18 can be switches owned by the telephone and cable television companies, respectively, located in the same or different regions as the local portions 12a and 12b of the split personal computer system 10.

The split personal computer system 10 also includes at least one remote portion 22 disposed remotely with respect to the local portions 12a and 12b of the split personal computer system 10. In essence, the remote portion 22 of the split personal computer system 10 is adapted to perform the heavy computational and storage functions of the personal computer tasks of the split personal computer system 10. The remote portion 22 of the split personal computer system 10 is provided with a plurality of remote computer units 24 networked and controlled by a remote system controller 26. Only two of the remote computer units are shown in FIG. 1 and designated by the reference numerals 24a and 24b for purposes of clarity. The remote computer units 24a and 24b can be any suitable computers which are capable of communicating with another computer located remotely with respect to such remote computer units 24a and 24b. The remote computer units 24 can be located at an individual's office, home, or any other suitable location. Application programs are typically stored on the remote computer units 24 and the data associated with previous usage by the individual are stored on the remote computer units 24 so that such application programs and data are accessible by the local portion 12a and 12b of the split personal computer system 10, as will be discussed below.

The remote system controller 26 communicates with the telephone network controller 14 and the television network controller 18 via respective communication links 27a and 27b and also communicates with the remote computer units 24a and 24b via respective communication links 28a and 28b. The remote system controller 26 can be any type of computer or controller which is capable of receiving signals transmitted from at least one local portion 12 of the split personal computer system 10 and supplying such signals to at least one of the remote computer units 24 to permit bidirectional communication therebetween.

For example, the remote system controller 26 can be a network control computer which stores a list of access codes for individuals authorized to use the remote computer units 24. The remote system controller 26 can also include a billing program which counts the time periods in which an individual utilizes at least one of the remote computer units 24 so that either session billings (in the case of hotel rooms billings, for example) or monthly billings could be made. The time periods can be measured in seconds, minutes or any other suitable unit of time.

The local portions 12a and 12b of the split personal computer system 10 are substantially identical in construction and function. Thus, only the local portion 12a of the split personal computer system 10 will be described herein in detail for purposes of clarity.

Figure 2:
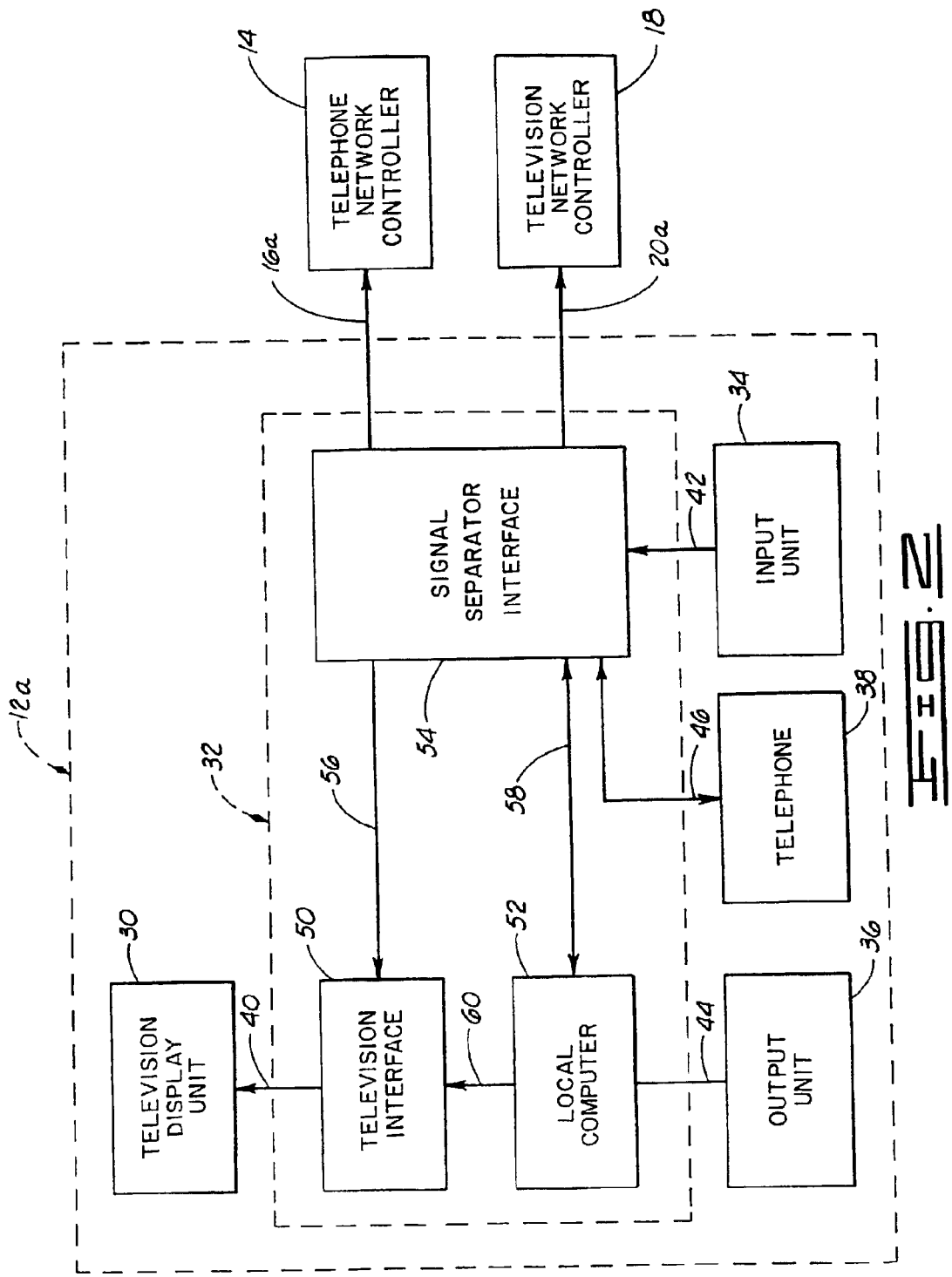
FIG. 2 is a schematic, diagrammatic view of one preferred embodiment of the local portion of the split personal computer system in which a television display unit is used as a monitor and a television accessory unit is provided to communicate with the remote portion of the split personal computer system and the television display unit.

As shown in FIG. 2, the local portion 12a of the split personal computer system 10 is provided with a television display unit 30, a television accessory unit 32 (shown in dashed lines), an input unit 34, an output unit 36 and a telephone 38.

The television display unit 30 can be any suitable television set or other display device, such as a computer monitor which is capable of receiving television or other video signals from the television accessory unit 32 via a communication link 40 and outputting signals in a format perceivable by an individual located adjacent the television set. The term "television signals" as used herein can mean signals adapted to be displayed by a television set, or any other type of suitable video and/or audio signals.

The input unit 34 can be a mouse, a keyboard, a scanner, a video wand, a remote control or any other suitable input unit. The input unit 34 is located adjacent the television display unit 30 and in communication with the television accessory unit 32 via a communication link 42 to input data signals into the television accessory unit 32.

The output unit 36 receives data signals from the television accessory unit 32 via a communication link 44 to provide an output signal in hardcopy or other tangible or intangible formats. The output unit 36 can be any type of output unit capable of receiving signals from the television accessory unit 32, such as a printer, a plotter, a local hard drive or a floppy disk.

The telephone 38 bidirectionally communicates with the television accessory unit 32 via a communication link 46. The telephone 38 can be any type of telephone or other suitable bidirectional communication system.

The television accessory unit 32 includes a television interface 50, a local computer 52 and a signal separator interface 54. Each of the television interface 50, local computer 52 and signal separator interface 54 can be located within a single portable housing 55 (FIG. 4) which is adapted to be disposed adjacent the television display unit 30, or can be provided as components included in the television display unit 30. The advantage of the portable housing 55 is that the individual can transport the television accessory unit 32 from one location to another location to remotely operate the remote portion 22 of the split personal computer system 10 with different television display units 30.

The local computer 52 can be any type of suitable computer and desirably includes temporary and permanent storage devices, and an operating system loaded thereon. The operating system can include the display and input/output portions of Windows 95, Windows 3.1, Macintosh, OS/2, NT95 or any other suitable operating system.

The signal separator interface 54 communicates with the telephone network controller 14 and the television network controller 18 via the communication links 16a and 20a. The signal separator interface 54 serves to route signals received thereby to the proper entity to process such signals. For example, two types of television signals can be received from the television network controller 18: those originally transmitted by the remote portion 22 of the split personal computer system 10 and those originally transmitted by a television station block 57 (FIG. 1). The signals originally transmitted by the remote portion 22 of the split personal computer system 10 are forwarded by the signal separator interface 54 to the local computer 52, and the signals originally transmitted by the television station block 57 are forwarded by the signal separator interface 54 to the television interface 50. The television station block 57 can be any television station which transmits audio and/or video signals which can be displayed or otherwise output by the television display unit 30. A header or other identifier can be included in the signals originally transmitted by the remote portion 22 of the split personal computer system 10 so that the signal separator interface 54 can distinguish between the signals originating from the remote portion 22 of the split personal computer system 10 and the television station block 57.

In addition, at least two types of signals can be received by the signal separator interface 54 from the telephone network controller 14: those originating from the remote portion 22 of the split personal computer system 10 and those not originating from the remote portion 22 of the split personal computer system 10. Those signals received by the signal separator interface 54 from the communication link 16a which are originated from the remote portion 22 of the split personal computer system 10 are transmitted to the local computer 52, and those signals which do not originate from the remote portion 22 of the split personal computer system 10 are transmitted to the telephone 38 via the communication link 46, for a purpose to be described hereinafter. A header or other identifier can be included in the signals originally transmitted by the remote portion 22 of the split personal computer system 10 so that the signal separator interface can distinguish between the signals originating from the remote portion 22 of the split personal computer system 10 and those not originating from the remote portion 22 of the split personal computer system 10.

The input unit 34 provides signals to the signal separator interface 54 over the communication link 42. Included in the signals provided to the signal separator interface 54, are three different categories of signals. The input unit 34 may include a header or other identifier in the signals it provides to the signal separator interface 54 so that the signal separator interface 54 can distinguish between the three different categories of signals.

The first category of signals are those which control the television display unit 30. Upon receipt of a signal in the first category, the signal separator interface 44 forwards such signals to the television interface 50 via a communication link 56. The television interface 50 then forwards such first category signals to the television display unit 30 so that the television display unit 30 will receive such first category signals and respond accordingly. First category signals include those signals which change the channel or volume of the television display unit 30, for example. Before the television accessory unit 32 can be utilized to access the remote portion 22 of the split personal computer system 10, an individual located adjacent the television display unit 20 operates the input unit 34 to tune the television display unit 20 to a suitable channel to receive television signals from the television accessory unit 32 via a communication link 40 so that the television display unit 30 selectively displays television signals output by the television accessory unit 32 in a format perceivable by at least one individual located adjacent the television display unit 30.

The second category of signals transmitted from the input unit 34 to the signal separator interface 54 are those signals intended to control or operate the local computer 52. Upon receipt of a second category signal, the signal separator interface 54 outputs such second category signal to the local computer 52 via a communication link 58. The second category signals can be the normal computer control signals plus a special remote logon command that can either be a set of keyboard strokes or a special function key provided on the input unit 34 for this purpose. Upon receipt of the remote logon command, the operating system software of the local computer 52 outputs signals to the television interface 50 which formats such signals as television signals. The television interface 50 then transmits the television signals to the television display unit 30 to cause the screen (or at least some portion thereof) of the television display unit 30 to appear as a normal personal computer screen selected by the individual (e.g. Windows 95, Windows 3.1, Macintosh, OS/2, NT95 or any other common PC screen used by the individual).

In addition, the receipt of the remote logon command causes the operating system software of the local computer 52 to output the remote logon command to the telephone network controller 14 via the communication links 58 and 16a. The telephone network controller 14 transmits the remote logon command to the remote system controller 26 via the communication link 27a. The remote system controller 26 receives the remote logon command, and in response thereto, the remote system controller 26 checks the remote logon command for validity and allows connection to at least one of the remote computer units 24 if the remote logon command is valid and prohibits connection of the remote portion 22 to the local portion 12 of the split personal computer system 10 if the particular remote logon command is not valid. The validity of the remote logon command can be determined in a manner recited in U.S. Pat. No. 4,528,643, issued to Charles C. Freeny on Jul. 9, 1985, which disclosure is hereby incorporated herein by reference.

Once the local portion 12 of the split personal computer system 10 and the remote portion 22 of the split personal computer system 10 are connected to permit communication therebetween, the remote portion 22 of the split personal computer system 10 provides video signals to the local portion 12 of the split personal computer system 10 via the sequential communication links 27b and 20a, and data signals to the local portion 12 of the split personal computer system 10 via the sequential communication links 27a and 16a. The video and data signals transmitted from the remote portion 22 of the split personal computer system 10 are received by the signal separator interface 54 and then forwarded to the local computer 52 via the communication link 58. The local computer 52 receives the video and data signals, and then the operating system of the local computer 52 transmits the video and data signals to the television interface 50 via a communication link 60. The television interface 50 then formats the video and data signals into audio television signals, video television signals or audio and video television signals. The television signals are then transmitted to the television display unit 30 so that the television signals are perceivable by the individual located adjacent the television display unit 30.

The third category of signals provided from the input unit 34 to the signal separator interface 54 can be those associated with mouse signals (point and click signals) or keyboard typing signals or any other suitable data input signals. The third category of signals are transmitted from the signal separator interface 54 to at least one of the remote computer units 24 via the sequential communication links 16a, 27a and 28a. The remote computer unit 24a receives such transmitted signals and processes same with at least one of the application computer programs to generate output signals including video and data signals. The video signals are transmitted from the remote computer unit 24a to the signal separator interface 54 of the television accessory unit 32 via the sequential communication links 28a, 27b and 20a. The data signals are transmitted from the remote computer unit 24a to the signal separator interface 54 of the television accessory unit 32 via the sequential communication links 28a, 27a and 16a.

The signal separator interface 54 receives the video and data signals and in response thereto, the signal separator interface 54 transmits such video and data signals to the local computer 52 via the communication link 58. The local computer 52 receives the video and data signals and transmits at least some of such video and data signals to the television display unit 30 via the television interface 50 to update the screen. Some of the data signals received by the local computer 52 can be directed to the output unit 36 to provide tangible and/or intangible output of the data signals.

The above stated process is then repeated a plurality of times so that the local and remote portions 12 and 22 of the split personal computer system 10 cooperate to provide the illusion of a single complete personal computer system to the individual located at the local portion 12 of the split personal computer system 10. That is, the remote portion 22 of the split personal computer system 10 provides the individual utilizing the local portion 12 of the split personal computer system 10 with access to the application software packages stored on the remote portion 22 of the split personal computer system 10, and data stored on the remote portion 22 of the split personal computer system 10 on behalf of the individual in conjunction with previous usage. The local portion 12 of the split personal computer system 10 provides the individual with visual feedback via the television display unit 30, and input and output capabilities via the input unit 34 and the output unit 36.

Figure 3:
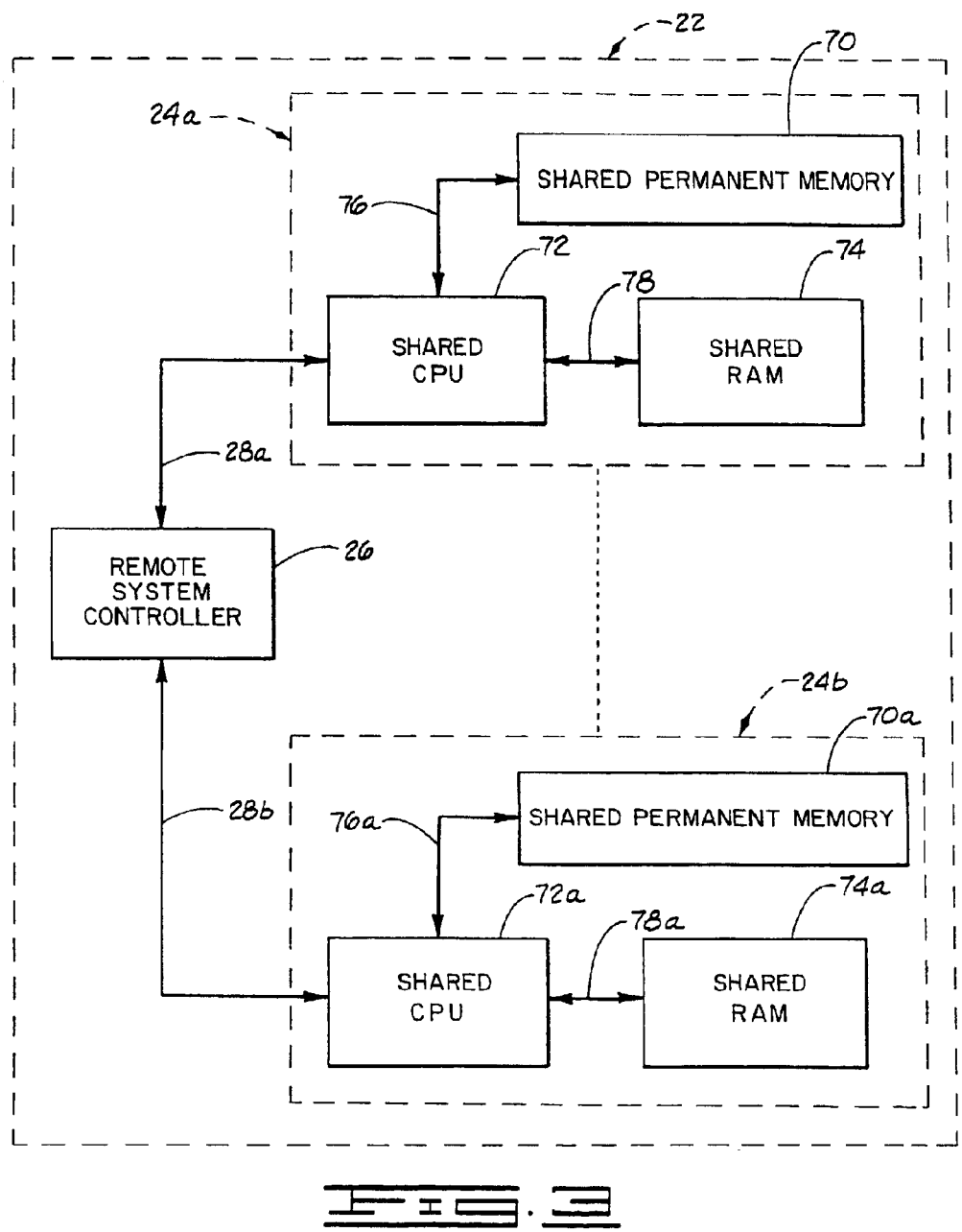
FIG. 3 is a schematic, diagrammatic view of the remote portion of the split personal computer system.

Shown in FIG. 3 is a schematic diagram of the remote portion 22 of the split personal computer system 10. The remote computer units 24 are substantially identical in construction and function. Thus, only the remote computer unit 24a will be described herein for purposes of clarity.

However, like components on the remote computer units 24a and 24b will be designated with the same numeral, but different alphabetic suffixes "a" and "b", respectively.

The remote computer unit 24a is provided with a permanent memory 70a, a central processing unit 72a and a random access memory (RAM) 74a. The central processing unit 72a can communicate with the permanent memory 70a and the random access memory 74a via communication links 76a and 78a in a manner well known in the art. The remote computer units 24 can be provided with operating system software stored either on the permanent memory 70 or the random access memory 74 to permit more than one individual to simultaneously utilize or share each of the permanent memory 70, central processing unit 72, and/or random access memory 74 on the remote computer units 24 to conserve resources. The remote computer units 24 can be loaded with any or all of the application software currently available, such as WordPerfect®, Lotus 1,2,3®, Excel®, MS Word® and Access® brand software, for example.

Although more than one local portion 12 of the split personal computer system 10 can communicate with the remote portion 22 of the split personal computer system 10 simultaneously, the probability that all of the local portions 12 of the split personal computer system 10 will utilize the remote portion 22 of the split personal computer system 10 simultaneously is slim. To further conserve resources, the remote portion 22 of the split personal computer system 10 desirably has less remote computer units 24 than the number of local portions 12 of the split personal computer system 10 which have access thereto.

In one embodiment, a method for utilizing the split personal computer system 10 includes the step of inputting respective data signals into at least two of the television accessory units 32 of the local portions 12 of the split personal computer system 10. The television accessory units 32, then output the respective data signals to the remote portion 22 of the split personal computer system 10 via respective communication links 16a and 16b, the telephone network controller 14 and the communication link 27a. The remote portion 22 of the split personal computer system 10 receives the respective data signals. The respective data signals are then forwarded to at least one of the remote computer units 24 which then processes the respective data signals with at least one application program to generate output signals.

The output signals are then output by the remote portion 22 of the split personal computer system 10 to the television accessory units 32 via the communication link 27b, the television network controller 18, and the communication links 20a and 20b such that output signals are received by the television accessory unit 32 which correspond to the data signals input to that respective television accessory unit 32. Each television accessory unit 32 outputs the respective output signals received from the remote portion 22 of the split personal computer system 10 to the television display unit 30 as television signals. And, each television display unit 30 receives the television signals output by the respective television accessory units 32 and then outputs the television signals in a format perceivable by at least one individual located near the television display unit 30.

Although only one cycle of the method is described herein, it should be understood that such method can be repeated any number of times so that respective individuals are simultaneously provided with the illusion of operating a complete personal computer system.

Figure 4:
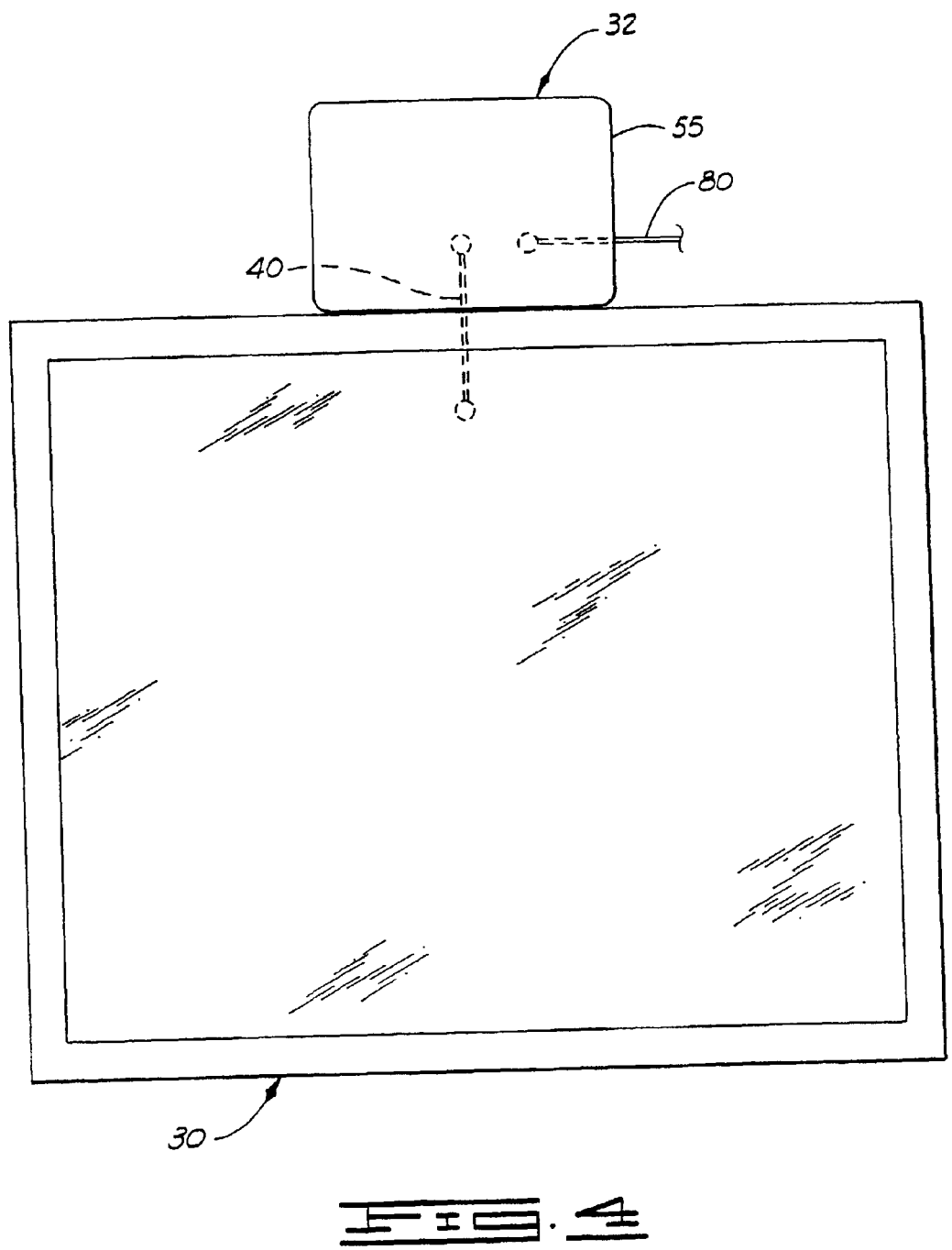
FIG. 4 is a front elevational view of the television accessory unit disposed on the television display unit.

Shown in FIG. 4 is the television accessory unit 32 disposed on top of the television display unit 30. As shown, the television accessory unit 32 having the portable housing 55 can be in the form of a cable television interface box interconnecting the television display unit 30 to a cable television connection 80. The cable television connection 80 is desirably interfaced with both the telephone network controller 14 and the television network controller 18 so that telephone, internet and television access, for example, is provided from the cable television connection 80 currently provided in suitable locations such as homes, hotels and businesses.

Although the present invention has been shown and described herein as operating with the television display unit 30, it should be understood that the present invention should not be limited to including, the television display unit 30. For example, a monitor or other type of output unit can be utilized in place of the television display unit 30.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a service for connecting a local computer unit to a remote computer unit to permit the local computer unit to operate the remote computer unit, the remote computer unit comprising a personal computer, the method comprising the steps of:

establishing a remote system controller on an internet such that the remote system controller is remote from the local computer unit and the remote computer unit;

receiving, by the remote system controller, a valid logon command; and interfacing, through the remote system controller, the local computer unit with the remote computer unit to permit the local computer unit to operate the remote computer unit wherein an input unit of the local computer unit functions as an input unit of the remote computer unit and a display device of the local computer unit displays output signals from the remote computer unit; and generating a bill for the service.

2. A method for providing a service for connecting a local computer unit to a remote computer unit to permit the local computer unit to operate the remote computer unit, the remote computer unit comprising a personal computer, the method comprising the steps of:

operating a network control computer that is remote from the local computer unit and the remote computer unit to connect the remote computer unit to the local computer unit permitting the local computer unit to operate the remote computer unit upon receipt of a valid logon command identifying the remote computer unit; and generating a bill for the service.

* * * * *

US007016943C1

(12) EX PARTE REEXAMINATION CERTIFICATE (6893rd)
United States Patent
Freeny

(10) Number: US 7,016,943 C1
(45) Certificate Issued: Jun. 23, 2009

(54) SPLIT PERSONAL COMPUTER SYSTEM

(75) Inventor: Charles C. Freeny, Dallas, TX (US)

(73) Assignee: Automated Business Companies, Spring, TX (US)

Reexamination Request:
No. 90/008,053, Jun. 6, 2006
No. 90/008,264, Oct. 6, 2006
No. 90/008,273, Oct. 6, 2006
No. 90/008,263, Oct. 6, 2006

Reexamination Certificate for:
Patent No.: 7,016,943
Issued: Mar. 21, 2006
Appl. No.: 10/253,332
Filed: Sep. 23, 2002

Related U.S. Application Data

(63) Continuation of application No. 10/050,624, filed on Jan. 16, 2002, now abandoned, which is a continuation of application No. 09/443,125, filed on Nov. 18, 1999, now Pat. No. 6,360, 253, which is a continuation of application No. 09/014,859, filed on Jan. 29, 1998, now Pat. No. 6,243,743.

(51) Int. Cl.
G06F 15/16 (2006.01)

(52) U.S. Cl. .................. 709/217; 709/202; 709/203; 709/212; 709/216; 709/250; 375/E7.019
(58) Field of Classification Search .................. None
See application file for complete search history.

(56) References Cited

U.S. PATENT DOCUMENTS

| 3,363,234 A | 1/1968 | Erickson et al. |
| 4,351,025 A | 9/1982 | Hall, Jr. |
| 4,396,984 A | 8/1983 | Videki, II |
| 4,495,570 A | 1/1985 | Kitejima et al. |
| 4,589,068 A | 5/1986 | Heinen, Jr. |
| 4,652,990 A | 3/1987 | Pailen et al. |
| 4,939,509 A | 7/1990 | Bartholomew et al. |
| 4,949,257 A | 8/1990 | Orbach |
| 4,999,771 A | 3/1991 | Ralph et al. |
| 5,047,928 A | 9/1991 | Wiedemer |
| 5,051,822 A | 9/1991 | Rhoades |
| 5,062,059 A | 10/1991 | Youngblood et al. |
| 5,115,499 A | 5/1992 | Stiffler et al. |
| 5,142,624 A | 8/1992 | Patrick, II |
| 5,157,769 A | 10/1992 | Eppley et al. |

(Continued)

FOREIGN PATENT DOCUMENTS

WO    WO 98/35291    8/1997

OTHER PUBLICATIONS

Schauer, Hervé, et al., "An Internet Gatekeeper", Symposium Proceedings, UNIX Security III, Baltimore, MD, Sep. 14–16, 1992, pp. 49–61.

Thompson, J. David, et al., "A Secure Public Network Access Mechanism", Symposium Proceedings, UNIX Security III, Baltimore, MD, Sep. 14–16, 1992, pp. 227–238.

(Continued)

Primary Examiner—Charles Craver

(57) ABSTRACT

A personal computer system split into a local portion and a remote portion. In one embodiment the remote portion of the split personal computer system is located in a remote location and normally maintained by a network service provider and has personal computer application programs stored thereon that are controlled by the individuals local portion. The remote portion provides one or more personal computer application programs as a service that can be selected by the individual and stores the individuals data after running the personal computer application program selected by the individual. Both the selected program and the individuals data can be accessed upon providing a valid password by the individual. The remote portion has a controller that can collect fees for the application program services provided each individual.

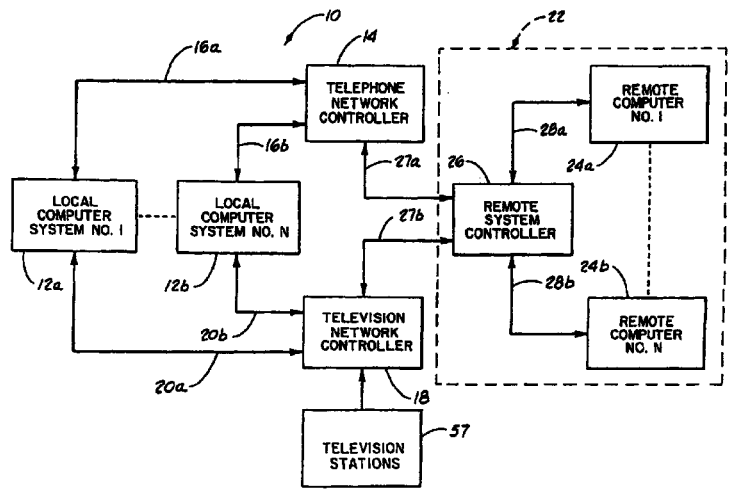

U.S. PATENT DOCUMENTS

| | | | |
|---|---|---|---|
| 5,206,934 A | 4/1993 | Naef, III | |
| 5,208,912 A | 5/1993 | Nakayama et al. | |
| 5,241,594 A | 8/1993 | Kung | |
| 5,249,290 A | 9/1993 | Heizer | |
| 5,263,165 A | 11/1993 | Janis | |
| 5,283,861 A | 2/1994 | Dangler et al. | |
| 5,287,461 A | 2/1994 | Moore | |
| 5,293,619 A | 3/1994 | Dean | |
| 5,349,675 A | 9/1994 | Fitzgerald et al. | |
| 5,355,365 A | 10/1994 | Bhat et al. | |
| 5,388,211 A | 2/1995 | Hornbuckle | |
| 5,392,400 A | 2/1995 | Berkowitz et al. | 709/203 |
| 5,396,546 A | 3/1995 | Remillard | |
| 5,410,543 A | 4/1995 | Seitz et al. | |
| 5,418,919 A | 5/1995 | Kadosawa et al. | |
| 5,421,009 A | 5/1995 | Platt | |
| 5,426,427 A | 6/1995 | Chinnock et al. | |
| 5,485,370 A | 1/1996 | Moss et al. | |
| 5,497,479 A | 3/1996 | Hornbuckle | |
| 5,522,070 A | 5/1996 | Sumimoto | |
| 5,537,548 A | 7/1996 | Fin et al. | |
| 5,544,320 A | 8/1996 | Konrad | |
| 5,548,645 A | 8/1996 | Ananda | |
| 5,564,043 A | 10/1996 | Siefert | |
| 5,577,251 A | 11/1996 | Hamilton et al. | |
| 5,581,390 A | 12/1996 | Fielden et al. | |
| 5,583,997 A | 12/1996 | Hart | |
| 5,590,199 A | 12/1996 | Krajewski, Jr. et al. | |
| 5,598,536 A | 1/1997 | Slaughter et al. | |
| 5,613,089 A | 3/1997 | Hornbuckle | |
| 5,649,187 A | 7/1997 | Hornbuckle | |
| 5,664,778 A | 9/1997 | Kikuchi et al. | |
| 5,666,501 A | 9/1997 | Jones et al. | |
| 5,692,126 A | 11/1997 | Templeton et al. | |
| 5,726,912 A | 3/1998 | Krall, Jr. et al. | |
| 5,745,556 A | 4/1998 | Ronen | |
| 5,758,072 A | 5/1998 | Filepp et al. | |
| 5,758,074 A | 5/1998 | Marlin et al. | |
| 5,764,639 A | 6/1998 | Staples et al. | |
| 5,771,354 A | 6/1998 | Crawford | |
| 5,781,909 A | 7/1998 | Logan et al. | |
| 5,802,299 A | 9/1998 | Logan et al. | |
| 5,805,806 A | 9/1998 | McArthur | |
| 5,812,930 A | 9/1998 | Zavrel | |
| 5,862,339 A | 1/1999 | Bonnaure et al. | |
| 5,889,935 A | 3/1999 | Ofek et al. | |
| 5,901,228 A | 5/1999 | Crawford | |
| 5,925,103 A | 7/1999 | Magallanes et al. | |
| 5,928,329 A | 7/1999 | Clark et al. | |
| 5,930,258 A | 7/1999 | Dato Solis et al. | |
| 5,956,697 A | 9/1999 | Usui | |
| 5,982,392 A | 11/1999 | Anfossi et al. | |
| 5,984,783 A | 11/1999 | Kikuchi et al. | |
| 5,991,735 A | 11/1999 | Gerace | |
| 5,991,799 A | 11/1999 | Yen et al. | |
| 6,081,508 A | 6/2000 | West et al. | |
| 6,085,228 A | 7/2000 | Tharakan | |
| 6,161,137 A | 12/2000 | Johnson | |
| 6,175,854 B1 | 1/2001 | Bretscher | |
| 6,209,025 B1 | 3/2001 | Bellamy | |
| 6,233,604 B1 | 5/2001 | Van Horne et al. | |
| 6,263,346 B1 | 7/2001 | Rodriquez | |
| 6,263,363 B1 | 7/2001 | Rosenblatt et al. | |
| 6,275,851 B1 | 8/2001 | Cromer et al. | |
| 6,317,797 B2 | 11/2001 | Clark et al. | |
| 6,331,855 B1 | 12/2001 | Schauser | |
| 6,334,147 B1 | 12/2001 | Cromer et al. | |
| 6,343,311 B1 | 1/2002 | Nishida et al. | |
| 6,370,582 B1 | 4/2002 | Lim et al. | |
| 6,393,380 B1 | 5/2002 | Zemlo | |
| 6,397,245 B1 | 5/2002 | Johnson, II et al. | |
| 6,487,590 B1 | 11/2002 | Foley et al. | |
| 6,529,938 B1 | 3/2003 | Cochran et al. | |
| 6,671,813 B2 | 12/2003 | Ananda | |
| 6,680,730 B1 | 1/2004 | Shields et al. | |
| 6,725,250 B1 | 4/2004 | Ellis, III | |
| 7,007,070 B1 | 2/2006 | Hickman | |
| 7,010,577 B1 | 3/2006 | Philyaw et al. | |
| 7,016,943 B2 | 3/2006 | Freeny | |
| 7,043,536 B1 | 5/2006 | Philyaw et al. | |
| 7,099,924 B1 | 8/2006 | Henniger et al. | |
| 2001/0011308 A1 | 8/2001 | Clark et al. | |
| 2002/0144271 A1 | 10/2002 | Behagen et al. | |
| 2003/0055870 A1 | 3/2003 | Smethers | |

OTHER PUBLICATIONS

Baldwin, Bob, et al., "Dial–In Security Firewall Software", Symposium Proceedings, UNIX Security IV, Santa Clara, California, Oct. 4–6, 1993, pp. 59–62.

Kahn, Brian L., "Safe Use of X Window System Protocol Across a Firewall", The Fifth USENIX UNIX Security Symposium, Jun. 5–7, 1995, pp. 105–116.

Wong, Alexander Ya–Li, et al., "Evaluating Windows NT Terminal Server Performance", Proceedings of the $3_{rd}$ USENIX Windows NT Symposium, Seattle, Washington, Jul. 12–13, 1999.

York, Kyle, "Building a DOS Serial Network," Dr. Dobb's Journal, May 1996, pp. 38–43, p. 80.

Rubinstein, Charles B., et al., "Corporate Networking Applications", AT&T Technical Journal, Sep./Oct. 1991, pp. 27–35.

Oseka, Juliet, "Remote Control Software", Working at Home, Jul. 1995, vol. 6, Issue 7.

Murphy, Gwen, "Breakthrough New Software Allows Individuals to Open Personal Web Offices", Press Release, Netopia, Inc., Alameda, California, Dec. 9, 1996.

Murphy, Gwen, "Farallon Reports Fiscal First Quarter 1997 Results", Press Release, Netopia, Inc., Alameda, California, Jan. 23, 1997.

"Netopia™ Virtual Office Reviewer's Guide", pp. 1–12, Undated.

"Netopia™ Virtual Office Reference Guide", p. 4, Undated.

Murphy, Gwen, "Farallon Upgrades Netopia Virtual Office for Windows NT 4.0 and 3.51", Press Release, Netopia, Inc., Alameda, California, Jun. 23, 1997.

"Technote Index", Netopia Central Hardware and Software Technote Index, http://web.archive.org/web/19980223233024/www.netopia.com/support/technotes, Retrieved on Aug. 24, 2006.

"Netopia Virtual Office 1.1", Netopia Virtual Office Support Index, http://web.archive.org/web/19980223223947/www.netopia.com/support/technotes/software, Retrieved on Aug. 24, 2006.

"FAQ—Netopia Virtual Office", Netopia: FAQ—Netopia Virtual Office, http://web.archive.org/web/19980223223857/www.netopia.com/support/faqs/software/nvo..., Retrieved on Aug. 24, 2006.

"NVO_001: Internet Addressing and DNS Servers", Technical Notes: Internet Addressing with NVO, http://web.archive.org/web/19980223235426/www.netopia.com/support/technotes/software..., Retrieved on Aug. 24, 2006.

"NVO_002: Free Web Address", Technical Notes: NVO Free Web Address, http://web.archive.org/web/19980223235435/www.netopia.com/support/technotes/software..., Retrieved on Aug. 24, 2006.

"NVO_003: Plug-ins and ActiveX Controls", Technical Notes: NVO Plugins, http://web.arvhive.org/web/19980223235442/www.netopia.com/support/technotes/software..., Retrieved on Aug. 24, 2006.

"NVO_004: Security", Technical Notes: NVO Security, http://web.archive.org/web/19980223235448/www.netopia.com/support/technotes/software..., Retrieved on Aug. 24, 2006.

"NVO_005: Modifying Netopia Virtual Office Pages", Technical Notes: Modifying NVO, http://web.archive.org/web/19980223235455/www.netopia.com/support/technotes/software..., Retrieved on Aug. 24, 2006.

Kleinberg, Bennett, et al., Netopia and GeoCities Release Netopia Virtual Office 2, Press Release, Alameda and Santa Monica, California, http://web.archive.org/web/19980223223537/www.netopia.com/corp/press/98_1_12.html Jan. 12, 1998.

"Netopia virtual Office 2.0 Release Notes", Netopia Virtual Office 2.0 Release Notes, http://web.archive.org/web/19980127062259/www.netopia.com/support/technotes/software.nvo..., Retrieved on Aug. 21, 2006.

Netopia Press Releases, http://web.archive.org/web/19980223233010/www.netopia.com/corp/press, Retrieved on Aug. 24, 2006.

"Frequently Asked Questions", Netopia Virtual Office FAQs, http://web.archive.org/web/19980127051737/http://netopia.com/software/nvo/win/faq.html, Retrieved on Aug. 21, 2006.

Netopia Virtual Office Help Guide, pp. 1–33 (Undated).

"Netopia Virtual Office", Netopia Virtual Office—Index, http://web.archive.org/web/19980223230156/www.netopia.com/software/nvo/, Retrieved on Aug. 24, 2006.

"More Info About Netopia Virtual Office", Netopia Virtual Office—More Info, http://web.archive.org/web/19980223224744/www.netopia.com/software/nvo/more_info.h..., Retrieved on Aug. 24, 2006.

"Netopia Virtual Office Overview", Netopia Virtual Office Overview Page, http://web.archive.org/web/19980224000001/www.netopia.com/software/nvo/win/overview..., Retrieved on Aug. 24, 2006.

"Netopia Virtual Office", Netopia Virtual Office Screenshots–in–Basket, http://web.archive.org/web/19980224004013/www.netopia.com/software/nvo/win/in_basket... Retrieved on Aug. 24, 2006.

"Netopia Virtual Office—Out Basket", Netopia Virtual Office Screenshots—Out Basket, http://web.archive.org/web/19980224004019/www.netopia.com/software.nvo/win/out_basket.. Retrieved on Aug. 24, 2006.

"Netopia Virtual Office—Conference Room", Netopia Virtual Office Screenshots—Conference Room, http://web.archive.org/web/19980224004025/www.netopia.com/software/nvo/win/conference..., Retrieved on Aug. 24, 2006.

"Netopia Virtual Office—Screensharing", Netopia Virtual Office Screenshots: Look and Control, http://web.archive.org/web/19980224004034/www.netopia.com/software/nvo/win/look_an..., Retrieved on Aug. 24, 2006.

"Netopia Virtual Office—Conference Room: Intercom", Netopia Virtual Office Screenshots—Chat, http://web.archive.org/web/19980224004040/www.netopia.com/software/nvo/win/chat.html, Retrieved on Aug. 24, 2006.

"Netopia Virtual Office—Pictures", Netopia Virtual Office Screenshots—Gallery, http://web.archive.org/web/19980224004055/www.netopia.com/software/nvo/win/gallery..., Retrieved on Aug. 24, 2006.

"Netopia Virtual Office—Ironclad Security", Netopia Virtual Office Screenshots—Security, http://web.archive.org/web/19980224002544/www.netopia.com/software/nvo/win/security..., Retrieved on Aug. 24, 2006.

"Netopia Virtual Office—Setup", Netopia Virtual Office Screenshots—Setup, http://web.archive.org/web/19980223232629/www.netopia.com/software/nvo/win/setup.html, Retrieved on Aug. 24, 2006.

"Netopia Virtual Office—Office Door", Netopia Virtual Office Screenshots—Office Door, http://web.archive.org/web/19980224000209/www.netopia.com/software/nvo/win/office_d..., Retrieved on Aug. 24, 2006.

"Netopia Virtual Office—Business Card", Netopia Virtual Office Screenshots—Business Card, http://web.archive.org/web/19980224004101/www.netopia.com/software/nvo/win/busines..., Retrieved on Aug. 24, 2006.

"Customization of the Citrix ICA Web Client", Citrix Systems, Inc., Citrix Consulting Services, pp.1–9 (Undated).

"LapLink Gold 11.0", http://reviews.cnet.com/LapLink_Gold, Retrieved on Aug. 22, 2006.

"Symantec pcAnywhere™ Administrator's Guide", Chapter 4 (2004).

"Managing Security in Symantec pcAnywhere™", Chapter 6 (Undated).

"The Evolution of the Win 32 ICA Clients", Citrix (Undated).

"Symantec Ships pcANYWHERE32 v 7.5 for Windows 95 and Windows NT", Symantec Corporation, Jun. 18, 1996.

Bowen "Will Lights on Broadway Outshine Java", SunWorld, Feb. 1996 ("Broadway").

Dossick, et al., "Distributed Tool Services Via the World Wide Web", Oct. 1, 1996.

Croes, "Enterprise–strength Remote Access", Network World, Jul. 15, 1996.

Edwards, "Connecting Users in the Outer Network—Remote Access Options", Communications News, Jun. 1997.

Strothman, "Want to View Your Plant's Operation? Surf Your Internet", InTech, Oct. 1997.

Farallon Communications, Inc., Netopia Virtual Office, Version 1.0, "Getting Started with Netopia Virtual Office Windows version", Copyright 1997 v.0297 ("Virtual Office Guide").

Farallon Communications, Inc., Press Release, "Farallon's Netopia Virtual Office Software Now Generally Available for Individuals to Open Personal Web Offices", Mar. 3, 1997 ("Virtual Office PR").

Farallon Communicatons, Inc., Netopia Timbuktu Pro for Macintosh, Version 3.0 "User's Guide Macintosh Edition", Copyright 1996 v.896 ("Timbuktu User's Guide").

Farallon Communications, Inc., Press Release "Farallon Redefines Macintosh Remote Access and Internet Collaboration", Sep. 3, 1996 ("Timbuktu PR").

Netopia, Inc. (f.k.a. Farallon Communications, Inc.), Press Release, "Netopia and GeoCities Announce Joint Venture to Enhance User Productivity on the Internet", Dec. 2, 1997 ("Hosted Virtual Office").

Farallon Communications, Inc., Netopia Virtual Office Release Notes, Mar. 1997 ("Netopia Virtual Office Release Notes").

Farallon Communications, Inc., "Timbuktu Pro Enterprise Security White Paper", Copyright 1997.

Williams, et al. "A High–Performance Active Digital Library", Parallel Computing, V. 24 Iss. 12–13 pp. 1791–1806, Nov. 1998.

Gajeway, Charles H. "Just Like Being There—Review of Eight Remote Control Programs—Includes Vendor Directory and Purchasing 'Cheat Sheet'—Software Review—Evaulation", Home Office Computing: May 1997.

"Stac ReachOut 7.0 Adapts to New Paradigms" ("Reach Out"), Mike Fratto, Network Computing, Apr. 1, 1997.

"A Modular Computer Sharing System", Herbert B. Baskin, et al., Communications of the ACM (R.L. Ashenhurst, editor) (the Baskin article), vol. 12, Oct. 1969.

"The X Windows System and Broadway, Accessing UNIX/X Windows Applications Over the Internet, Intranet and Entreprise Extranet"), White Paper, Hummingbird Communications, Ltd., Copyright 1996 ("Hummingbird Paper").

Scheifler, "Broadway—Universal Access to Interactive Applications Over the Web", slides presented at Xtech '96, Feb. 12–14, 1996, ("Universal Access").

"Lotus to Develop New Class of Collaborative Internet Applicatons Designed for Rental by Web Users", Oct. 15, 1996.

O'Shea, "Apps for Rent: Rentable Applications Give ISPs a Way to Play the Good Host", Telephony Online, Sep. 7, 1998.

Source Lotus Development Corp., "Lotus Continues Domino Momentum with Aggressive Pricing for Electronic Commerce Solution", PR Newswire: Dc. 11, 1996, available at http://www.highbeam.com/library/doc3.asp?DOCID=1G1:18936950&num=2&ctrlInfo=Round19%3AProd%ASR%3ASR%AResult&ao=&FreePremium=BOTH.

Source Lotus Development Corp., "Domino.Merchant Transforms a Web Site Into a Powerful Selling Engine", PR Newswire: Nov. 18, 1996, available at http://www.highbeam.com/library/doc3.asp?DOCID=1G1:18866222&num=1&ctrlInfo=Round19%3AProd%3ASR%3AResult&ao=&FreePremium=BOTH.

Source Lotus Development Corp., "Lotus and Business Partners Create Standard Platform for Developing and Hosting Rentable Applications", PR Newswire: Jun. 17, 1997, available at http://www.highbeam.com/library/doc3.asp?DOCID=1G1:19514076&num=23&ctrlInfo=Round19%3AProd%3ASR%3AResult&ao=&FreePremium=BOTH.

Schwartz, Jeffrey, "Lotus' Domino Effect—ISPs Can Rent Websites Via Company's New Software", Communications Week: Oct. 21, 1996, available at http://www.highbeam.com/library/doc3.asp?DOCID=1P1:28486756&num=5&ctroInfo=Round19%3AProd%3ASR%3AResult&ao=&FreePremium=BOTH.

Robinson, Phillip, "San Jose Mercury News, Calif., Phillip Robinson Column. (Originated from San Jose Mercury News, Calif.)", Knight Ridder/Tribune Business: Apr. 30, 1995, available at http://www.highbeam.com/library/doc3.asp?DOCID=1G1:16900178&num=1&ctrlInfo=Round19%3AProd%3ASR%3AResult&ao=1&FreePremium=BOTH.

Leibs, Scott, "Software For Rent—Internet providers hope renting will bring them closer to customers", InformationWeek: Oct. 31, 2006, available at http://www.informationweek.com/683/83iurnt.htm.

Wainewright, Phil, "Interliant Site Offers Instant Online Rental", ASPnews.com: Sep. 23, 1998, available at http://www.aspnews.com/news/product_launches/article.php/373001.

Steiner, Jennifer G. et al., "Network Services in the Athena Environment", Project Athena, Massachusetts Institute of Technology: Jul. 21, 1988, pp. 1–10.

DePasquale, Ellen, "Remote Control Software: Extending the Boundaries of Your Office", Making Connections: Sep. 1996, vol. 4 Issue 9, available at http://www.smartcomputing.com/editorial/article.asp?article=articles/archive/2pcb/2pcb35/2pcb35.asp&guid=.

Schurman, Kyle, "Be Two Place at Once with Remote Computing", Working At Home: Jul. 1996—vol. 7 Issue 7, available at http://www.smartcomputing.com/editorial/article.asp?article=articles/1996/jul96/96n0744/96n0744.asp&articleid=1225&guid=F253EE4E6CCC4970BD09FA81D4457B95.

Hardy, Norman, "The Origins of Tymnet", Roots of Tymer, May 30, 2006 pp. 1–3 available at http://www.cap-lore.com/Tymnet/ETH.html.

Wikipedia, "Tymnet", available at http://en.wikipedia.org/wiki/Tymnet.

Hyperdictionary, "Tymnet", available at http://www.hyperdictionary.com/search.aspx?define=tymnet.

K. R. Wood, T. Richardson, F. Bennett, A. Harter and A. Hopper, "Global Teleporting with Java: Toward Ubiquitous Personalised Computing", IEEE Computer, vol. 30, No. 2, Feb. 1997.

Cox, John, "Web Creates New Challenge for Client/Server Applications", Network World: Apr. 7, 1997.

Earley, J., "Remote LAN access", IEEE Xplore, The Home as an Office, IEE Colloquium: p. 1 abstract, Feb. 29, 1996.

Earley, J., "Remote LAN access", IEEE Xplore, The Home as an Office, IEE Colloquium: pp. 1–16, Feb. 29, 1996.

Patz, Joel T., "Just Like Being There—Review of Six Remote Access Software Packages—Includes Product Directory—Software Review—Evaulations", Home Office Computing: May 1996.

Provided by: ProQuest Information and Learning Company, "A Remote Control Roadster and a Luxury Sedan", Network World Inc.: Jan. 23, 1995.

Watt, Peggy, "Norton Puts pcAnywhere on Server for Remote Access", Network World Inc.: Nov. 28, 1994.

Watt, Peggy, "Remote Access Products Reign in Spring Releases", Network World Inc.: pp.1–2, May 22, 1995.

Cavanah, Cassandra, "Remote Possibilities: Not in Your Office? Remote Control Software Make it Simple to Access Your Computer", Entrepreneur Media, Inc.: pp. 1–3, Nov. 1997.

Richardson, Tristan et al., "Teleporting in an X Window System Environment: a ubiquitous presonalized computing environment for all", IEEE Personal Communications: pp. 6–12, Third Quarter 1994.

Bennett, Frazer et al. "Teleporting—Making Applications Mobile", IEEE: pp. 82–84, 1995.

Wood, Kenneth R. et al., "Global Teleporting with Java: Toward Ubiquitous Personalized Computing", IEEE: pp. 53–59, 1997.

Richardson, Tristan et al., "Virtual Network Computing", IEEE: pp. 33–38, Jan.–Feb. 1998.

Halfhill, Tom, "Cheaper Computing, Part I", BYTE.com: pp. 1–8, Apr. 1997 available at http://www.byte.com/art/9704/sec6/art1.htm#047csa2.

Comerford, Richard, "The Battle for the Desktop", IEEE Spectrum: pp. 21–28, May 1997.

Bockenski, Barbara, "Developers Need Network Know-How; Communication Integral to Architecture—Client/Server 101—Includes a Related Article Listing 10 Important Networking Features—Column", Wiesner Publications, Inc.: pp. 1–2, Sep. 15, 1993 available at http://www.findarticles.com/p/articles/mi_mOSMG/is_n14_v13/ai_14426054?lstpn=search_sampler&lstpc=search&lstpr=internal&lstprs=looksmart&lstwid=1&lstwn=search_results&lstwp=body_middle.

Storm, David, "Novell Connect Analysis", David Storm Inc.: pp. 1–3, 1993 available at http:www.strom.com/pub-work/nw93.html.

PR Newswire, "Lotus Ships Domino SPA Tools to Enable Web Developers to Create 'Rentable' Applications Based on Lotus Domino," Jan. 23, 1997 ("Lotus Rentable Applications").

"A Modular Computer Sharing System," authored by Herbert B. Baskin, Elsa B. Horowitz, Robert D. Tennison, and Larry E. Rittenhouse, which was published in Oct. 1969, in vol. 12 of Communications of the ACM (R.L. Ashenhurst, editor) ("the Baskin article").

"Stac ReachOut 7.0 Adapts to New Paradigms" ("Reach Out") by Mike Fratto was published in the Apr. 1, 1997 issue of Network Computing.

"Just like being there—review of eight remote control programs" ("Just Like Being There") by Charles H. Gajeway was published in Home Office Computing in May 1997.

"Enterprise Computing: Net vendors, ISPs raise credibility of rented software" ("Enterprise Computing") by Amy Doane was published in InfoWorld on Aug. 25, 1997.

Cox, "Web Creates New Challenge for Client/Server Applications," Network World, Apr. 7, 1997.

"Lotus Announces Instant! Teamroom Rentable Collaborative Application," Jun. 17, 1997.

"Lotus Ships Domino SPA Tools to Enable Web Developers to Create 'Rentable' Applications Based on Lotus Domino," Jan. 23, 1997.

Symantec pcANYWHERE32 v. 7.5 User's Guide excerpts, 1993–1996.

Symantec Corporation, "Symantec Ships pcANYWHERE32 v 7.5 for Windows 95 and Windows NT," dated Jun. 18, 1996.

Symantec Corporation, Symantec pcANYWHERE32 v 7.5 User's Guide, cover page, copyright page, and pp. 1–7, 1–11, 2–1; 2–2, Chapter 4, Chapter 5, Chapter 10, Copyright 1993–1996.

Lotus Development Corp., "Lotus Announces Instant! Teamroom Rentable Collaborative Application," dated Jun. 17, 1997.

Lotus Development Corp., "Lotus Ships Domino SPA Tools to Enable Web Developers To Create 'Rentable' Applications Based On Lotus Domino," dated Jan. 23, 1997.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

1. A method for providing a service for connecting a local computer unit to a remote computer unit to permit the local computer unit to operate the remote computer unit, the remote computer unit comprising a personal computer, the method comprising the steps of:

establishing a remote system controller on an internet such that the remote system controller is remote from the local computer unit and the remote computer unit;

receiving *and checking the validity*, by the remote system controller, a valid logon command; and interfacing, through the remote system controller, the local computer unit with the remote computer unit to permit the local computer unit to operate the remote computer unit wherein an input unit of the local computer unit functions as an input unit of the remote computer unit and a display device of the local computer unit displays output signals from the remote computer unit; and generating a bill for the service.

2. A method for providing a service for connecting a local computer unit to a remote computer unit to permit the local computer unit to operate the remote computer unit, the remote computer unit comprising a personal computer, the method comprising the steps of:

operating a network control computer that is remote from the local computer unit and the remote computer unit to connect the remote computer unit to the local computer unit permitting the local computer unit to operate the remote computer unit upon receipt *and checking the validity* of a valid logon command identifying the remote computer unit; and generating a bill for the service.

* * * * *